United States Patent [19]
Burkard

[11] Patent Number: 4,502,901
[45] Date of Patent: Mar. 5, 1985

[54] MANUFACTURE OF GYPSUM BOARD FROM FGD GYPSUM

[75] Inventor: Edward A. Burkard, East Amherst, N.Y.

[73] Assignee: National Gypsum Company, Dallas, Tex.

[21] Appl. No.: 543,174

[22] Filed: Oct. 19, 1983

[51] Int. Cl.³ .............................................. B32B 31/06
[52] U.S. Cl. ..................................... 156/39; 106/109; 423/171; 428/703
[58] Field of Search ............... 106/103, 109, 110, 117; 156/39; 423/242, 554, 555, 171, 172; 428/703

[56] References Cited

U.S. PATENT DOCUMENTS

| | | | |
|---|---|---|---|
| 3,445,323 | 5/1969 | Schnabel | 156/39 X |
| 3,836,630 | 9/1974 | Noguchi et al. | 423/242 |
| 3,873,492 | 3/1975 | Takehisa et al. | 106/111 X |
| 3,956,456 | 5/1976 | Keller et al. | 423/171 |

FOREIGN PATENT DOCUMENTS 698052  11/1964  Canada .

*Primary Examiner*—Robert Dawson
*Attorney, Agent, or Firm*—Robert F. Hause

[57] ABSTRACT

By-product gypsum, which is formed during a flue gas desulfurization process, (FGD gypsum) is carefully formed as an aqueous slurry of crystals having a mean particle diameter of between about 35 microns and 80 microns and filtered, which filter cake is substantially completely dried before calcination, without any substantial grinding action, the crystals are then flash calcined to a hemihydrate, then ground, to reduce consistency, and then formed into an aqueous slurry from which a paper-covered gypsum board is formed of superior core quality.

18 Claims, 1 Drawing Figure

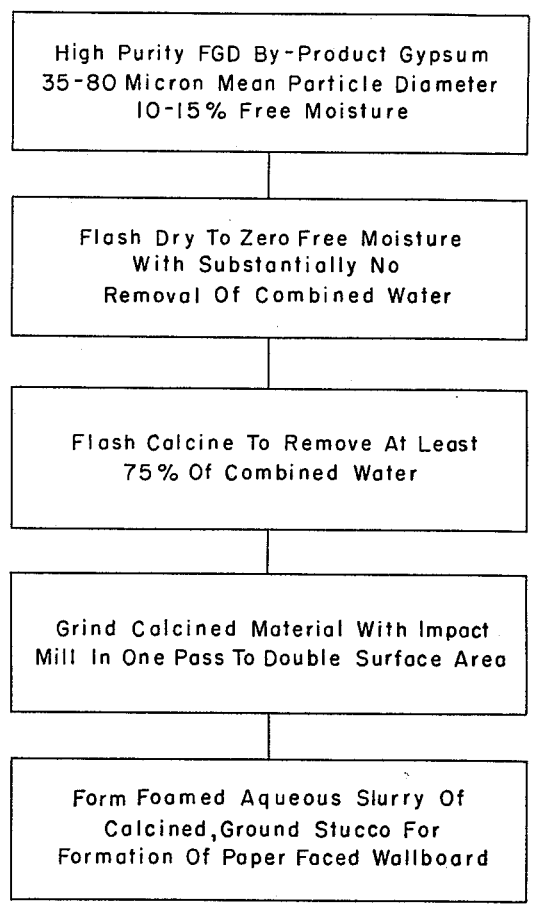

```
┌─────────────────────────────────────┐
│  High Purity FGD By-Product Gypsum  │
│  35-80 Micron Mean Particle Diameter│
│         10-15% Free Moisture        │
└─────────────────────────────────────┘
                  │
┌─────────────────────────────────────┐
│    Flash Dry To Zero Free Moisture  │
│         With Substantially No       │
│       Removal Of Combined Water     │
└─────────────────────────────────────┘
                  │
┌─────────────────────────────────────┐
│    Flash Calcine To Remove At Least │
│         75% Of Combined Water       │
└─────────────────────────────────────┘
                  │
┌─────────────────────────────────────┐
│  Grind Calcined Material With Impact│
│  Mill In One Pass To Double Surface Area │
└─────────────────────────────────────┘
                  │
┌─────────────────────────────────────┐
│    Form Foamed Aqueous Slurry Of    │
│       Calcined, Ground Stucco For   │
│     Formation Of Paper Faced Wallboard │
└─────────────────────────────────────┘
```

MANUFACTURE OF GYPSUM BOARD FROM FGD GYPSUM

This invention relates to a process for making improved gypsum board from FGD by-product gypsum.

Presently substantially all domestic gypsum wallboard is manufactured using natural gypsum. The use of synthetic gypsum, such as the by-product from phosphoric acid production, in manufacturing gypsum wallboard is known, and is discussed in prior U.S. patents.

The by-product of phosphoric acid production has certain disadvantages in such use, including, particularly, an excessive amount of radioactivity, considering how such a product might be used in substantial quantities to form all the walls and the ceilings of a room.

To avoid this problem, it has now been found how a superior gypsum wallboard can be produced using a form of gypsum which is the by-product of a flue-gas desulfurization process (hereinafter referred to as FGD). It should be stated that radioactivity is not a problem when FGD by-product gypsum is used. In addition, the FGD gypsum is generally made at a purity of 94–98% purity, whereas natural gypsum deposits are generally less than 90% purity.

The FGD by-product gypsum can be carefully formed to produce gypsum crystals having a mean particle diameter of between about 35 microns and 80 microns. This FGD by-product gypsum can be produced as an aqueous slurry consisting of relatively pure calcium sulfate dihydrate. If the slurry is thickened and filtered on a drum, belt, or centrifuge filter system, the free water present can be reduced to 10–15% based on the weight of the gypsum.

In accordance with the invention, the above-described filter cake of FGD gypsum crystals is subjected to a flash drying and deagglomeration process, to eliminate preferably 100% of the free moisture present, which may also unavoidably remove a minimal percentage of the combined moisture of the FGD dihydrate gypsum crystals.

This dried product is subjected to a Calcidyne flash calcination process, as disclosed for use with natural gypsum in U.S. Pat. No. 3,956,456, to remove 75% of the combined water in the FGD dihydrate gypsum molecules. This flash calcined FGD hemihydrate gypsum, or a portion of it, is then subjected to a grinding process in a mechanical impact-type mill employing a single row of pins on a high speed rotor and a companion row of pins formed into the mill housing liner.

The resultant product has been found to surprisingly function to produce a superior gypsum wallboard, when combined with water and formed between two paper liners.

Some of the reasons why this result was unexpected relate to physical phenomena that cannot be fully understood. All of the prior commercial use of the Calcidyne flash calcination process of U.S. Pat. No. 3,956,456 has been with natural gypsum which was ground to a fineness of about 10 to 20 microns average particle diameter, based on a Leeds-Northrup Microtrac analysis. The ability of the Calcidyne flash calcination process to produce a high quality calcined gypsum from the much larger particle size FGD gypsum was therefore not expected. Since the Calcidyne flash calcining process produces uniformly calcined larger particles with the FGD gypsum it is now possible to reduce the particle size to the desired size after calcination rather than before, and since the calcined hemihydrate material can be reduced in particle size easier than the uncalcined dihydrate, a very substantial savings in power required for grinding is provided.

Since post-grinding flash calcined natural gypsum normally results in no change or an increase in the water demand, it was an unexpected advantage to find that post-grinding the FGD flash calcined gypsum lowered the water demand, making possible lower drying costs when used for manufacturing wallboard.

It is an object of the present invention to employ a certain advantageous by-product gypsum in the production of gypsum wallboard.

It is a further object to provide a process for employing FGD by-product gypsum in the production of gypsum wallboard.

It is a still further object of the invention to produce a superior gypsum wallboard, using FGD by-product gypsum as the starting material.

These and other objects and advantages of the invention will be more readily apparent when considered in relation to the preferred embodiments as set forth in the specification and shown in the drawing in which a flow diagram of the process of the invention is shown.

In accordance with the present invention, gypsum wallboard is produced using, as at least a substantial portion of the gypsum starting material, a by-product gypsum produced in desulfurization of a flue gas. One such desulfurization process is disclosed in U.S. Pat. No. 3,836,630. This process, and other flue gas desulfurization processes, can produce by-product gypsum slurries having a solids purity of from 88% to 98% gypsum, average gypsum particle diameters of from 35 to 80 microns, preferably from 60 to 70 microns, and gypsum crystal shapes with an X:Y ratio less than 10, which are thus suitable for use in the processes of the invention.

The FGD by-product gypsum slurries are preferably filtered and received for use in gypsum wallboard production at a free moisture content of about 15%, and a combined water content of about 20%, based on solids content, and a purity of from 94% to 98%. Impurities include inert materials, such as $SiO_2$, and $CaCO_3$. Soluble ion impurities such as $Mg^{++}$, $Na^+$, $Cl^-$, $SO_3^-$ must be kept to a very low prescribed level in order not to adversely affect the final product.

The 15% free moisture filter case is continuously fed to a flash dryer such as a Raymond Cage Mill Flash Drying System sold by C-E Raymond Combustion Engineering Inc. of Chicago, Ill. This drying system can, with the largest available unit, dry the 15% filter cake at a rate of 50 tons/hour. The thermal efficiency of this dryer is about 82%.

The Cage Mill Flash Drying System includes a cage mill which disintegrates agglomerated material without any grinding or particle breakdown. The damp FGD gypsum is fed into a supply of air at about 900° F. as the air enters the cage mill at the central axis. The exit air temperature is 185°–200° F. The cage mill has a plurality of rotating impellers which break up the agglomerated damp gypsum prior to its being hot air conveyed to a cyclone separator. Dried FGD gypsum is discharged from the cyclone separator through a rotating air lock and the hot conveying air is directed to a secondary collector to remove substantially all of the solids still present.

The dried FGD gypsum has substantially no free moisture and is still substantially free of any calcined gypsum.

This dried FGD gypsum is then conveyed to a flash calciner as disclosed in U.S. Pat No. 3,956,456, wherein a process is described for calcining a gypsum raw material which has been pre-ground, as is common when calcining natural gypsum.

The dried, but not pre-ground, FGD gypsum is continuously fed to a peripherally confined cylindrical heating zone by means of a moist heated gas stream moving tangentially into the upper part of the heating zone. The FGD gypsum then moves through the heating zone in a spirally moving heated gas stream, which is repeatedly replenished by additional heated gas streams entering the heating zone through a plurality of entry orifices arranged essentially tangential to and along the cylindrical periphery of the heating zone and distributed generally throughout the entire surface of the cylinder. The FGD gypsum is heated by the heated gas to a temperature which is sufficient to remove part of the chemically bound water therein. The moist heated gases are then drawn off from the heating zone in the vicinity of the central axis and about 90% of the exhaust gases are heated anew to a higher temperature. Calcined FGD gypsum, mostly in the form of calcium sulfate hemihydrate, is removed from the heating zone at the bottom.

A portion or all of this flash calcined FGD gypsum is then screw conveyed to the inlet of a centrifugal impact mill, such as the Entoleter CentriMil TM mill, sold by Entoleter, Inc. of New Haven, CT, preferably the series 42 mill. The mill employs a rotor, rotating at 1100-2000 rpm, which has projecting out from the rotor a plurality of pins which impact the powder fed thereto, and propel the powder against a target area where final particle size reduction takes place. The target area has a companion row of stationary pins formed into the mill housing liner. The processed material then spirals to the bottom of the conical discharge hopper and out to bins or conveyors.

Preferably about 25%-50% of the flash calcined FGD gypsum is impact milled, followed by thorough blending with the 50%-75% of material not milled. A Fisher surface area of the 100% milled product or of the blended product has been found to necessarily be at least about 2500 cm$^2$/gm in order to be usable to make good quality lightweight wallboard at normal production rates. The calcined FGD gypsum, prior to post-grinding has a surface area of about 800-1700 cm$^2$/gm. By impact milling 25%-50% of the calcined FGD gypsum to a fineness of about at least 4000 cm$^2$/gm and then blending it with 50%-75% unground calcined FGD gypsum, a final blend of at least 2500 cm$^2$/gm is provided at a lower cost. Grinding 25%-50% of the material to 4000 cm$^2$/gm has been found to be less costly, based on equipment and power costs, than grinding 100% of the material to >2500 cm$^2$/gm.

The flash calcined FGD gypsum consistency is unexpectedly reduced by the post-grinding from about 70 cc/100 gms to about 65 cc/100 gms, providing a material which requires less water added to produce a workable slurry for the manufacture of wallboard, and thus reducing the cost of drying wallboard produced with the post-ground flash calcined FGD gypsum.

Gypsum wallboard is produced from a paper-faced aqueous slurry of the flash calcined FGD gypsum in the standard process as is well known. A four-foot wide, half-inch wallboard can be produced with very good quality at weights of about 1600 pounds per thousand square feet.

This wallboard is produced by combining the flash calcined, post-ground FGD hemihydrate gypsum with water, an aqueous lightweight foam solution or other lightweight aggregate and other well known additives in a standard pin mixer, depositing the mixed slurry on the inner surface of a paper face sheet, folding the edges of the face sheet upwardly and inwardly, and placing a paper back sheet on the top surface, as the combined materials pass under a master roll which forms the composite into a continuous web wallboard of desired uniform thickness. This continuous web is conveyed for a time sufficient for hardening of the core prior to being cut into standard board lengths and dried in a high temperature oven.

The amount of water that needs to be removed in the drying oven is markedly reduced beyond what would be expected by the present invention. The flash calcined FGD gypsum, prior to post-grinding, has an ultimate water demand 9% lower than flash calcined natural gypsum. The water demand of the flash calcined FGD gypsum is further reduced to 14% lower than flash calcined natural gypsum by the post-grinding process. The natural flash calcined gypsum to which the comparison is made is a standard production material which was produced using a standard precalcination grinding without any post-calcination grinding. Natural gypsum always requires precalcination grinding because of the nature of the source, which is crushed rocks in particle size from fine dust to small rocks. Gypsum in this form could not be flash calcined.

A still further unexpected advantageous characteristic of the post-ground flash calcined FGD gypsum is that particle disintegration, or the degree of breakdown as it passes through the pin mixer, is less than natural gypsum. As a result, it maintains the very low water demand characteristic discussed above. The standard flash calcined natural gypsum, which is pre-ground, and not post-ground, breaks down to a greater degree as it passes through a pin mixer, and as a result its water demand increases, which further increases the cost of drying wallboard made from the natural gypsum.

Major factors in the lower water demand of the FGD gypsum are the uniform shape of the individually grown crystals, as received, the shallow depth of fissures and the lack of cleavage on the crystal surface and the significantly lower surface area of the flash calcined post-ground gypsum as compared to natural flash calcined pre-ground gypsum. For example, the absolute surface area determined by Nitrogen Absorption-BET method, revealed that by-product gypsum has a true surface area about four times less than natural gypsum.

A further advantage provided by the process of the invention is the greatly decreased energy requirements for grinding, resulting from being able to post-grind in place of pre-grinding. This advantage results from the brittle or friable nature of calcined gypsum as compared to the harder uncalcined gypsum, and thus the greater ease of breaking up calcined gypsum particles, to smaller size particles.

Having completed a detailed disclosure of a preferred embodiment of my invention so that those skilled in the art may practice the same, I contemplate that variations may be made without departing from the essence of the invention or the scope of the appended claims.

I claim:

1. The method of making gypsum wallboard comprising the steps of removing substantially all of the free moisture from an about 94% to 98% pure gypsum filter cake of about 35 to 80 micron average particle diameter FGD dihydrate gypsum while avoiding any substantial reduction of particle size of said gypsum other than the breaking up of agglomerates of particles, flash calcining said dried FGD gypsum to about 25% of the water of hydration producing FGD hemihydrate gypsum, grinding at least about 25% of said calcined gypsum to produce a Fisher surface area of material of at least about 2500 cm²/gm, said surface area being measured on the product as ground if 100% of the calcined gypsum is ground and on a blend of the ground product with the unground portion if less than 100% of the calcined gypsum is ground, mixing said post-ground calcined gypsum with water and a lightweight aggregate, and forming the resultant aqueous slurry into board form between opposed paper face sheets.

2. The method of claim 1 wherein about 25% to 50% of said calcined gypsum is ground to an increased surface area for mixture with 75% to 50% of unground calcined gypsum.

3. The method of claim 1 wherein said grinding of calcined gypsum is carried out in an impact mill.

4. The method of claim 3 wherein said impact mill is a centrifugal impact mill.

5. The method of claim 4 wherein said centrifugal impact mill is rotated at about 1100 to 2000 rpm.

6. The method of claim 4 wherein said centrifugal impact mill comprises a plurality of metal pins on a rotor and a plurality of metal pins on a fixed housing.

7. The method of claim 1 wherein said flash calcining comprises continuously feeding said dried FGD dihydrate gypsum to a peripherally confined cylindrical heating zone by means of a moist heated gas stream moving tangentially into the upper part of said heating zone, whereby said FGD gypsum being calcined is conveyed spirally through said heating zone.

8. The method of claim 7 wherein said moist heated gas stream is repeatedly replenished by additional heated gas streams entering said heating zone through a plurality of entry orifices arranged substantially tangential to and along said cylindrical periphery of said heating zone.

9. The method of claim 8 wherein about 25% to 50% of said calcined gypsum is ground to an increased surface area for mixture with 75% to 50% of unground calcined gypsum.

10. The method of claim 8 wherein said grinding of calcined gypsum is carried out in an impact mill.

11. The method of claim 10 wherein said impact mill is a centrifugal impact mill.

12. The method of claim 11 wherein said centrifugal impact mill is rotated at about 1100 to 2000 rpm.

13. The method of claim 1 wherein said average particle diameter is from about 60 microns to about 70 microns.

14. The method of claim 1 wherein said filter cake has from about 10% to 15% free water.

15. The method of claim 1 wherein said free moisture in said FGD dihydrate is removed in a cage mill flash dryer.

16. The method of claim 15 wherein said FGD dihydrate is continuously fed to said cage mill flash dryer.

17. The method of claim 1 wherein said formed board is dried in a high temperature drying oven.

18. The method of claim 17 wherein the dried board has a weight of about 1600 lbs/MSF/½ in. thickness.

* * * * *